(12) United States Patent
Bauernfeind (10) Patent No.: US 12,377,590 B2
(45) Date of Patent: Aug. 5, 2025

(54) PRODUCTION PLANT

(71) Applicant: ENGEL AUSTRIA GmbH, Schwertberg (AT)

(72) Inventor: Stephan Bauernfeind, Ried in der Riedmark (AT)

(73) Assignee: ENGEL AUSTRIA GmbH, Schwertberg (AT)

( * ) Notice: Subject to any disclaimer, the term of this patent is extended or adjusted under 35 U.S.C. 154(b) by 0 days.

(21) Appl. No.: 18/978,418

(22) Filed: Dec. 12, 2024

(65) Prior Publication Data
US 2025/0196415 A1 Jun. 19, 2025

(30) Foreign Application Priority Data

Dec. 14, 2023 (AT) .............................. A 51008/2023

(51) Int. Cl.
*B29C 45/76* (2006.01)
*B29C 45/50* (2006.01)
*B29C 45/82* (2006.01)

(52) U.S. Cl.
CPC ...... *B29C 45/7613* (2013.01); *B29C 45/5008* (2013.01); *B29C 2045/506* (2013.01); *B29C 2045/824* (2013.01)

(58) Field of Classification Search
CPC .......... B29C 45/5008; B29C 2045/506; B29C 45/613
See application file for complete search history.

(56) References Cited

U.S. PATENT DOCUMENTS 4,290,701 A * 9/1981 Schad ................ B29C 45/5008
425/207
6,379,119 B1 * 4/2002 Truninger ............. F04B 49/065
417/22
(Continued)

FOREIGN PATENT DOCUMENTS

CN 114915119 A * 8/2022 ............. H02K 15/02
CN 217350595 U * 9/2022
(Continued)

OTHER PUBLICATIONS

Machine translation DE7222289U (Year: 1972).*
(Continued)

*Primary Examiner* — Abbas Rashid
*Assistant Examiner* — Wayne K. Swier
(74) *Attorney, Agent, or Firm* — Wenderoth, Lind & Ponack, L.L.P.

(57) ABSTRACT

A production plant includes an injection unit suitable for forming processes, and the injection unit includes a barrel and an injection actuator, a hydraulic system for moving the injection actuator, an safety device configured to output an access signal when access detecting a person accessing the production plant and/or a possibility of a person accessing the production plant, and an electronic control unit to operate the hydraulic system in a production mode and in a safety mode. The control unit is configured to switch from the production mode to the safety mode when the access safety device outputs the access signal, and is configured to operate the hydraulic system in the safety mode such that the hydraulic system at least partially, preferably completely, counteracts an axial movement of the injection actuator caused directly or indirectly by an action of a molding compound present in the barrel on the injection actuator.

24 Claims, 3 Drawing Sheets (56) References Cited

U.S. PATENT DOCUMENTS

| | | | |
|---|---|---|---|
| 6,878,317 B2 * | 4/2005 | Kubota | B29C 45/82 |
| | | | 425/161 |
| 2008/0088048 A1 * | 4/2008 | Hayakawa | B29C 45/82 |
| | | | 425/161 |
| 2022/0032522 A1 * | 2/2022 | Deriche | B29C 45/23 |
| 2022/0381387 A1 * | 12/2022 | Fysikopoulos | F16L 37/50 |

FOREIGN PATENT DOCUMENTS

| | | | | |
|---|---|---|---|---|
| DE | 7222289 | | 10/1972 | |
| DE | 102006005300 A1 | * | 8/2006 | ......... B29C 45/5008 |
| EP | 0307058 A2 | * | 3/1989 | |
| JP | 07-32405 A | * | 2/1995 | |
| JP | 2014-28491 | | 2/2014 | |
| KR | 10-2018-0011706 | * | 2/2018 | |

OTHER PUBLICATIONS

Machine translation DE102006005300A1 (Year: 2006).*
Machine translation JPH0732405A (Year: 1995).*
Machine translation JP2014028491A (Year: 2014).*
Machine translation KR1020180011706A (Year: 2018).*
Machine translation CN217350595U (Year: 2022).*
Machine translation CN114915119A (Year: 2022).*
Office Action issued Jun. 11, 2024 in Austrian Application No. A 51008/2023 (with English translation).

* cited by examiner

PRODUCTION PLANT

BACKGROUND OF THE INVENTION

The present invention relates to a production plant and to a method for operating such a production plant.

Production plants are known which have the following features:
- an injection unit suitable for forming processes, in particular injection molding processes, which contains a barrel and an injection actuator,
- a hydraulic system for moving the injection actuator,
- an access safety device, which is designed to output an access signal when an access of a person to the production plant and/or an access possibility for a person to the production plant is detected, and
- an electronic control unit which is set up to operate the hydraulic system in at least one production mode and in at least one safety mode,
- wherein the control unit is designed to switch from the at least one production mode to the at least one safety mode when the access safety device outputs the access signal.

The relevant safety regulations stipulate that measures must be taken when the production plant is active but the access safety device is in an open configuration—i.e. there is an access possibility for persons—or the access safety device detects an access by a person. These measures are aimed at ensuring that the injection actuator does not perform any movement which would cause injection of the plasticized molding compound, which is subjected to high temperatures and pressures, into the mounted mold. This is because the leakage of the molding compound under the prevailing pressures can lead to injuries or death if a person were hit by the molding compound.

Known measures for preventing any injection movement are, for example, to switch an injection valve in such a way that the hydraulic fluid is discharged into a tank, or to isolate a pressure accumulator from the rest of the hydraulic system.

In many cases, this leads to the injection actuator performing a slight backward movement, while the production plant is operated in at least one safety mode. One reason for this is that the plasticization of the molding compound continues as a rule even in at least one safety mode and, as a result, more plasticized molding compound accumulates in the barrel than in the normal production operation. On the other hand, the molding compound itself can also carry out an expansion, especially if it contains, for example, dissolved gases for foaming or the like.

Subsequently, the situation thus changed must be taken into account if the production operation (at least one production mode) is to be resumed. The changed position of the injection actuator generally leads to the plasticized molding compound being injected in the environment in a controlled manner and being metered in again from the plasticizing process. The starting material for the plasticized mass is naturally lost. This also applies to the time and effort required for the described procedure.

In the worst case, the excessive amount of molding compound for the mold is injected when the production operation is resumed, which can lead to damage to the mold and even to destruction of the latter.

SUMMARY OF THE INVENTION

It is an object of the invention to avoid loss of material, time and labor as well as damage while simultaneously observing safety regulations.

With respect to the production plant, this object is achieved in that the control unit is set up to operate the hydraulic system in at least one safety mode in such a way that the hydraulic system at least partially, preferably completely, counteracts an axial movement of the injection actuator caused directly or indirectly by an action of a plasticized molding compound present in the barrel on the injection actuator.

With regard to the method, the object is achieved by a hydraulic system:
- of the production plant being operated in a safety mode when access to the production plant and/or an access possibility to the production plant is detected; and
- being operated in the safety mode in such a way that it at least partially, preferably completely, counteracts an axial movement of the injection actuator caused directly or indirectly by an action of a molding compound present in a barrel on an injection actuator.

Protection is also sought for the use of a production plant according to the invention in the method according to the invention.

A basic idea of the invention consists in the knowledge that the hydraulic system can be operated in such a way that the backward movement of the injection actuator is at least partially avoided even in the at least one safety mode. The undesirable consequences described therefore do not occur from the outset.

A central aspect of this is that the hydraulic system, although it is in at least one safety mode, can maintain a pressure for the injection actuator, so that on the one hand no feed movement takes place, but said backward movement is not carried out, or is carried out only to such a small extent, that said consequences, in particular the necessity of injecting out and new metering, do not occur.

The injection unit which is suitable for injection molding processes generally has a plasticizing screw which is arranged rotationally and linearly displaceably in the barrel. As a result of the rotational movement and, in most cases, also a heating of the barrel, the plastic material, which is present, for example, as granules, is subjected to thermal and shearing stress and thus changes into a plastic state. In the meantime, the plasticizing screw executes a certain retraction movement, so that the plasticized molding material collects in the screw antechamber in the plasticizing cylinder. This process is called metering.

By means of an axial feed movement, the plasticized molding compound is subsequently injected into a mold cavity of a tool mounted on the forming machine and is thus preformed.

However, other configurations of an injection unit suitable for an injection molding process are also conceivable. For example, an extruder (i.e. a plasticizing screw without an axial degree of freedom of movement) could also load one or more injection pistons (so-called "shot pots" or "shooting pots").

Other forming processes which have a certain similarity to the injection molding processes are known, wherein an injection actuator exerts a pressure on a plasticized or liquid molding compound, which pressure, when switching over into the safety mode, can lead to the injection actuator performing undesired movements. These other forming processes and, of course, injection molding processes themselves are merged within the scope of the present invention under the term forming processes.

Access safety devices are known per se and consist, for example, of a protective grid and a closed protective door which are connected to the control unit via a safety circuit (closed configuration, access is not possible). If the protective door is opened (open configuration, access is provided), the corresponding safety circuit is also opened and the control unit automatically switches to the at least one safety mode, because it is possible for persons to be in the region of the forming plant.

The opening of the safety circuit can be understood as the access signal output by the access safety device. The access signal can thus be realized not only as an active signal, but also as the omission of a continuous signal.

Under the access safety device, those devices are collectively designated which are intended to control the access of persons to those areas in which hazards may occur due to the forming process.

In addition to the protective grilles and doors mentioned, light barriers and light curtains can be used for this purpose, for example. Another example would be a nozzle protection for an injection nozzle, which is a protective plate by means of which persons in the vicinity of the injection nozzle are to be protected from being hit by molding material emerging under extreme pressure.

Within the scope of the invention, the access safety device can be understood as offering at least the possibility of detecting a person's access to the production plant and/or the possibility of a person's access to the production plant and, if this occurs, of outputting the access signal.

The production plant is to be understood here as a production cell or part of a production cell in which the mentioned injection molding process is carried out.

The electronic control unit can preferably be a central machine control of the production plant and/or the forming machine. Of course, it is also conceivable for the electronic control unit to be implemented separately from the machine by means of one or more computer servers arranged on the machine or remote from the machine—centrally or by means of distributed computing.

In the vast majority of cases, the control unit will carry out control and regulation of a wide variety of machine parameters. In principle, however, it is of course also possible to provide a separate control unit for the invention which only takes care of the functions according to the invention.

In this sense, the at least one safety mode can be understood as belonging to the hydraulic system. Of course, in many real cases, the rest of the molding plant will also be influenced by the at least one safety mode. As mentioned, the operation of the hydraulic system according to the invention is a core aspect of the invention. The same applies to the at least one production mode.

The at least one production mode is to be understood as that mode in which the production plant produces molded parts, specifically automatically, semi-automatically or theoretically also guided by an operator.

In at least one safety mode, no injection movement by the injection actuator should be possible. The relevant safety rules normally specify further safety measures to be complied with, such as at least one of the following:
  It must be ensured that the injector is closed or that all injectors are closed,
  It must be ensured that the molding compound is not discharged from the barrel, in particular is not injected to the outside, and
  The output of the existing drives—preferably all drives—is limited to respective (relatively low) maximum power outputs.

In principle, however, it is also conceivable within the scope of the invention that there are one or more safety modes which are distinguished from the at least one production mode only in that they realize the counteraction according to the invention against the backward movement of the injection actuator.

The invention can be used both in existing production plants (as a retrofit), for example by installing the connecting line mentioned below together with associated components, and in new production plants.

The facts, features and effects explained in connection with the prior art can also occur and/or be used in connection with the invention.

A hydraulic piston-cylinder unit can be provided for moving the injection actuator, the piston preferably being rotatable relative to the cylinder.

Due to the rotatability of the piston, a rotatability of the injection actuator in the barrel can be realized particularly simply.

For the rotation of the injection actuator, a separate metering drive can be provided, which is designed, for example, as a hydraulic motor. The hydraulic motor can be supplied by the hydraulic system according to the invention or by a separate hydraulic system.

In particularly preferred embodiments, the metering drive transmits a rotational movement to the piston rotatably mounted in the cylinder, and the rotational movement is transmitted from the piston to the plasticizing screw mounted thereon.

In principle, other embodiments are also conceivable, whereby no recourse is made to a piston-cylinder unit. For example, a hydraulic motor could be used, the output movements of which are converted into a linear movement via a mechanism, for example a spindle or a rack. However, embodiments with a piston-cylinder unit are preferred.

The injection actuator can comprise a plasticizing screw and/or an injection piston.

The hydraulic system may have at least one of the following:
  at least one pump including a pump motor for driving the at least one pump,
  at least one pressure accumulator and preferably a blocking slide by means of which the at least one pressure accumulator can be decoupled from the rest of the hydraulic system,
  an injection valve which is designed to release, shut off and/or meter a first hydraulic fluid stream provided for the injection actuator in order to carry out an injection movement,
  a brake valve which is designed to release, shut off and/or meter a second hydraulic fluid stream pushed out of the piston-cylinder unit during the injection movement, and/or
  a low-pressure volume, preferably a tank.

The brake valve can preferably be usefully used in injection units which realize particularly rapid injection movements. The brake valve creates an additional degree of freedom for the control or regulation of the injection movement, which can be used for particularly accurate regulation, as is advantageous in the case of particularly rapid movements.

Of course, there may also be a plurality of pump motors which together drive one or more pumps on a shaft or separately in each case.

The control unit can preferably be designed in at least one safety mode
  to limit a speed of the at least one pump motor to a maximum speed, to control the at least one blocking slide for decoupling the at least one pressure accumulator from the rest of the hydraulic system, to control the injection valve in such a way that there is a hydraulic connection between the injection actuator and the low-pressure volume, a fluid connection preferably being present between the injection actuator and the low-pressure volume when a further valve is switched, and/or to control the brake valve in such a way that there is a fluid connection between the piston-cylinder unit and the low-pressure volume.

As mentioned, a basic aspect of the at least one safety mode is that feed movements of the injection actuator are to be avoided, since they can lead to hazardous situations for persons in the region of the production plant.

A hydraulic connection is a connection which can become a fluid connection under certain pressure and/or switching conditions, but does not have to be present as such at all times. For example, a preloaded or switchable further valve may be present, so that the fluid connection is released only when a pressure in the hydraulic fluid exceeds a maximum pressure or the further valve is switched.

The hydraulic system can contain a connecting line which is set up in such a way that, in the at least one safety mode, there is a fluid connection between a pressure side of a pressure source, preferably the at least one pump, and the injection actuator, preferably via the injection valve.

At least one, preferably all, of the following may be provided in the connecting line:

a diaphragm for setting a maximum hydraulic fluid volumetric flow, a volumetric flow switching valve, preferably a volumetric flow control valve, and/or a pressure control valve.

By means of a separate volumetric flow control valve for the volumetric flow and/or a separate pressure control valve, the volumetric flow or the pressure at the injection actuator can be regulated particularly well, as a result of which the danger of an undesired feed movement in at least one safety mode can be kept particularly low.

Preferably, a dynamic pressure line can branch off from the connecting line, which opens into the low-pressure volume and in which a further valve is arranged, which can be switched.

The further valve is to be understood as a valve separate from the injection valve.

The further valve can be switched if a pressure in the hydraulic system becomes too high, for example if a pressure threshold value is exceeded.

In particularly preferred embodiments, however, the brake valve can function as the further valve.

Particularly preferably, the dynamic pressure line branches off from the connecting line on the actuator side with respect to the diaphragm, the volumetric flow control valve and/or the pressure control valve.

Particularly preferably, the dynamic pressure line branches off from the connecting line on the pump side with respect to the injection valve.

A position sensor for detecting a position of the injection actuator and/or of the piston of the piston-cylinder unit can be provided, the measuring signals of which can be fed to the control unit.

The control unit can be particularly preferably designed to control the hydraulic system, preferably the pump motor, for increasing or decreasing the pressure at the injection actuator on the basis of the measurement signals of the position sensor, in order to at least partially counteract a change in position of the injection actuator caused by the action of the plasticized molding compound present in the barrel.

This does not have to be a classic control, because the (active) retraction of the injection actuator does not necessarily have to be provided.

Nevertheless, a P, PI and/or PID regulation law can of course be used for this purpose, conservative amplification factors preferably being selected.

The injection unit can have a shut-off nozzle which is designed to prevent plasticized molding compound from escaping from the barrel, wherein a shut-off nozzle position sensor is preferably provided, the measurement signals of which can be fed to the control unit.

As a result, a further check can take place to ascertain that the injection actuator does not perform an injection movement. This is because if the shut-off nozzle position sensor detects that the shut-off nozzle is closed, injection of the molding compound cannot physically take place.

The access safety device can have at least one of the following: a protective grid, a protective wall and/or a protective door and/or a light barrier and/or a light curtain and/or a nozzle protection.

The production plant can have a forming machine and the injection unit can be part of the forming machine.

Molding machines are meant to include, for example, injection molding machines, injection presses or presses.

BRIEF DESCRIPTION OF THE DRAWINGS

Further advantages and details of the invention will be apparent from the following description with reference to the drawings, in which.

DETAILED DESCRIPTION OF THE INVENTION

Figure 1:
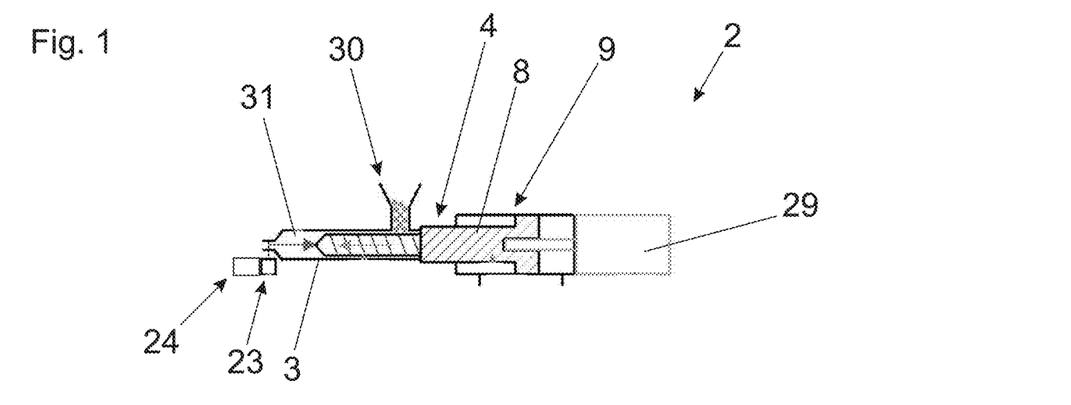
FIG. 1 schematically shows an exemplary embodiment of an injection unit.

FIG. 1 schematically shows an injection unit 2, as can be used in injection molding machines.

A plasticizing screw is arranged rotationally and axially displaceably in a barrel 3.

The plasticizing screw can be driven axially by means of a piston-cylinder unit comprising a piston 8 and a cylinder 9.

The piston 8 is rotatably mounted together with the plasticizing screw, so that a metering drive 29 can transmit a rotational movement to the piston 8 and further to the plasticizing screw.

The piston-cylinder unit together with the plasticizing screw together form the injection actuator 4 according to the invention.

Via a funnel 30, the starting material, for example a plastic granulate, can be filled into the barrel 3, in which it is plasticized by shearing and the action of heat-preferably wherein the barrel is heated from the outside. The plasticized molding compound 31 is then present in front of the plasticizing screw in the barrel 3.

The direct discharge of the plasticized molding compound 31 can be prevented or controlled by means of a shut-off nozzle 23, but it is also conceivable in principle that a shut-off nozzle 30 is not present.

By monitoring the position of the shut-off nozzle 23 by means of a shut-off nozzle position sensor 24, a further check can take place to ascertain that the injection actuator 4 does not execute an injection movement. This is because if the shut-off nozzle position sensor 24 detects that the shut-off nozzle 23 is closed, no plasticized molding compound 31 can physically escape from the barrel 3 and possibly reach the mold, which may not be completely closed.

In preferred embodiments, the position-monitored shut-off nozzle 23 is integrated into the safety concept of the production plant 1 via at least one safety circuit.

For injection, the piston 8 can be pushed forward hydraulically in the cylinder 9 (on the left in FIG. 1). As a result, the plasticized molding compound 31 is pushed out of the barrel 3 and injected, for example, into a molding tool, in which the molding compound is preformed.

Subsequently, further molding compound is plasticized by the rotation of the plasticizing screw, so that sufficient plasticized molding compound 31 is available for a further injection molding process. This is known as metering or upward metering.

During metering, the injection actuator 4 usually executes a slow backward movement (i.e. to the right in FIG. 1) because the dynamic pressure in the plasticized molding compound 31, visualized as an arrow to the right, slightly exceeds the countering force exerted by the piston 8, visualized as an arrow to the left.

Figure 4:
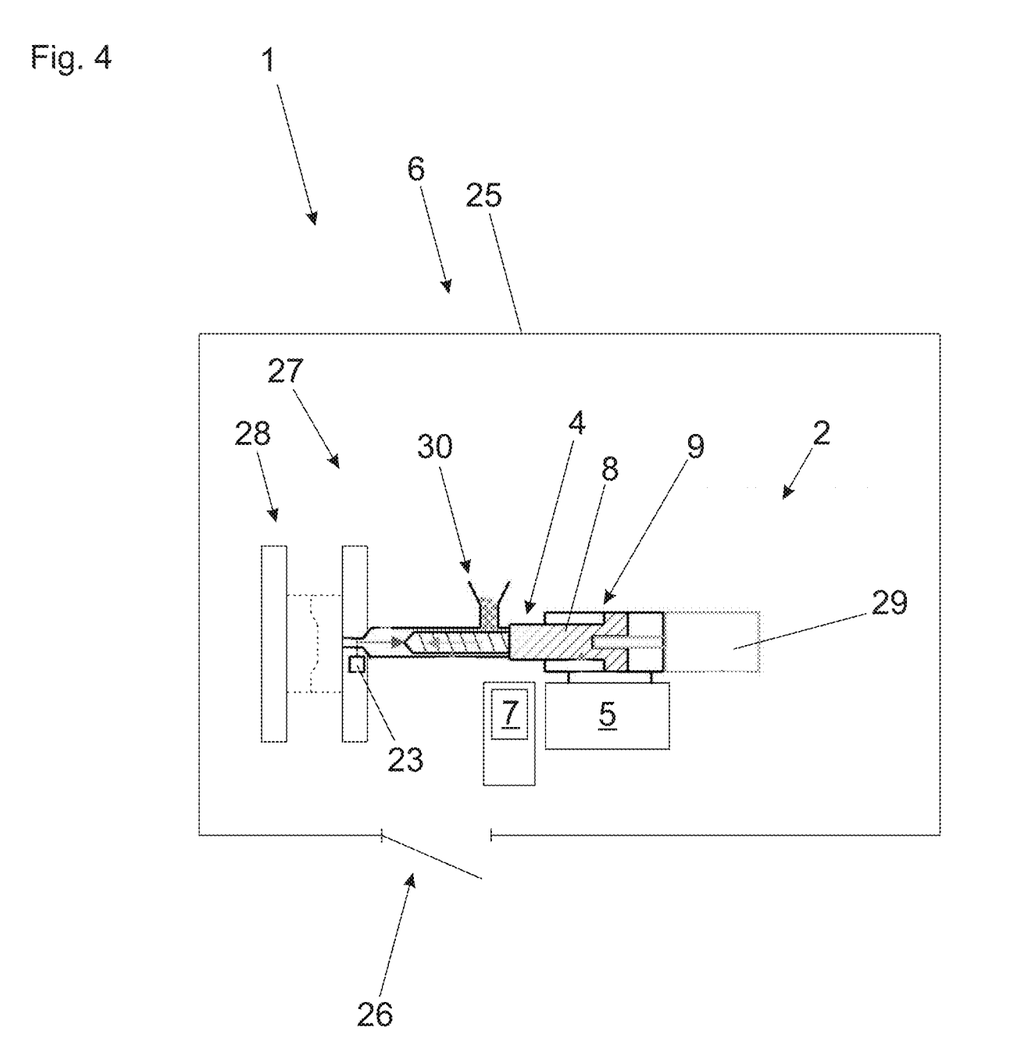

If the production plant 1 is switched into the at least one safety mode, for example because a protective door is opened as shown in FIG. 4, it must be ensured that no injection movement takes place, wherein in the prior art the piston 8 is usually simply relieved by discharging the hydraulic fluid into the tank.

However, this can also result in the aforementioned retraction movement continuing, even if, for example, the supply of granules is interrupted, because the pressure in the hydraulic system 5 and the friction in the cylinder 9 are too low. This undesired retraction movement can also be referred to as screw migration.

Figure 2:
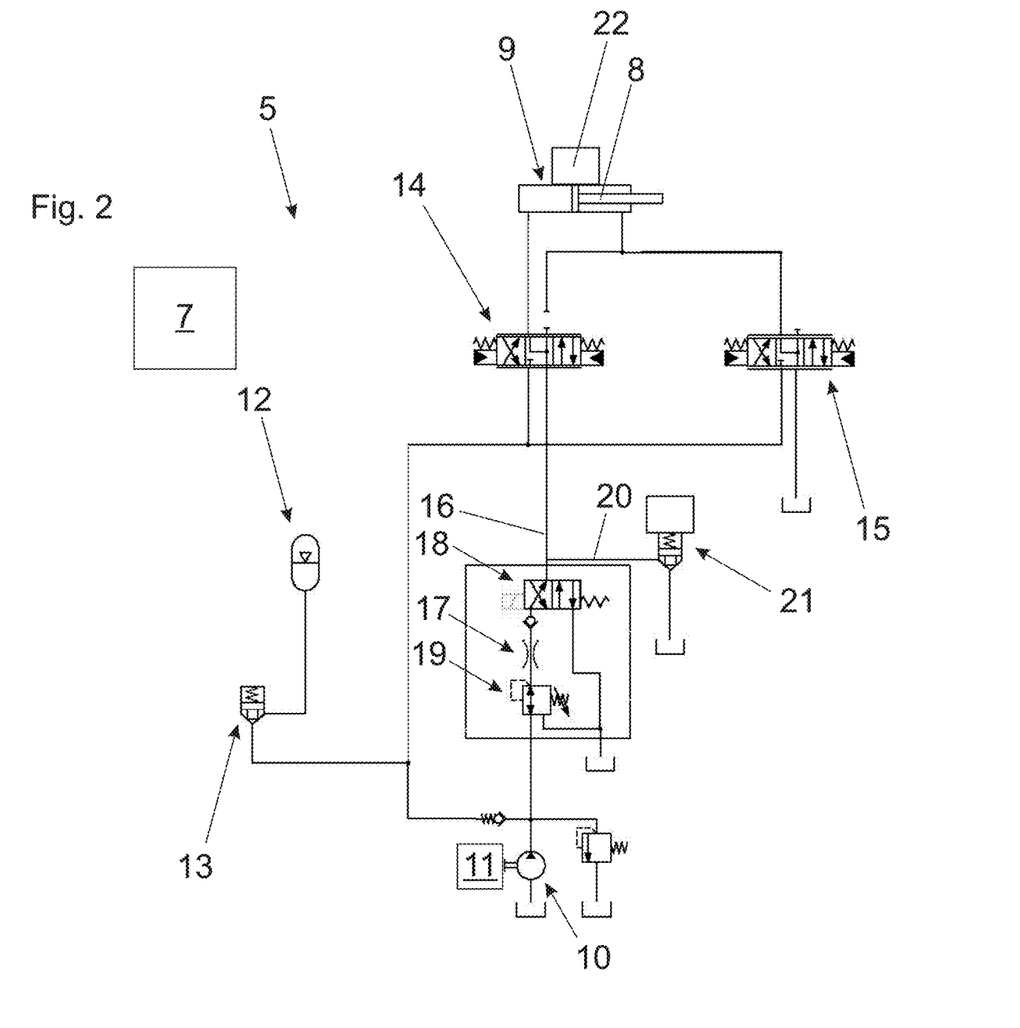
FIG. 2 schematically shows an exemplary embodiment of a hydraulic system.

FIG. 2 schematically shows an exemplary embodiment of a hydraulic system 5, such as can be used to drive the piston-cylinder unit, which are part of the injection actuator, and which is capable of at least partially preventing the undesired retraction movement in the at least one safety mode.

The hydraulic system 5 has the following components:
at least one pump 10 including a pump motor 11 for driving the at least one pump 10,
at least one pressure accumulator 12 and preferably a blocking slide 13 by means of which the at least one pressure accumulator 12 can be decoupled from the rest of the hydraulic system 5,
an injection valve 14, which is designed to release, shut off and/or meter a first hydraulic fluid stream provided for the injection actuator 4 in order to carry out an injection movement,
a brake valve 15 which is designed to release, shut off and/or meter a second hydraulic fluid stream pushed out of the piston-cylinder unit during the injection movement; and/or
a low-pressure volume in the form of at least one tank, which is indicated by the usual symbol.

The pressure accumulator 12 can preferably be designed as bubble accumulators which have a gas-filled bubble in a pressure vessel. Hydraulic fluid entering under pressure compresses the gas-filled bubble, so that the pressure is stored in the compressed gas.

Preferably, the pressure accumulator 12 is dimensioned and used in such a way that the pressure required for the injection movement comes essentially completely from the pressure accumulators 12 and the pump 10 is essentially only used in the at least one production mode to charge the pressure accumulator 12. Of course, a similar procedure can also be implemented with a plurality of pressure accumulators 12.

A position sensor 22 for detecting the position of the piston 8 and thus of the injection actuator 4 is provided.

A connecting line 16 makes it possible to connect that chamber in the cylinder 9 which is subjected to pressure for carrying out the injection movement (in contrast to FIG. 1, the chamber acting to the right) to the pressure side of the pump 10 via the injection valve 14.

The following is provided in the connecting line 16:
a diaphragm 17 for setting a maximum hydraulic fluid volumetric flow,
a volumetric flow control valve 18 and/or
a pressure control valve 19.

A dynamic pressure line 20 branches off from the connecting line 16 and opens out into the low-pressure volume and in which a further switchable valve 21 is arranged, so that a fluid connection is produced between the connecting line 16 and the low-pressure volume when the further valve 21 is switched, for example because the pressure in the hydraulic system 1 becomes too high. A pressure sensor, not shown, can of course be provided for detecting the pressure. The further valve 21 can also be referred to as a dynamic pressure cartridge, that is to say it can be a cartridge valve and/or a seat valve.

In this exemplary embodiment, the dynamic pressure line 20 branches off from the connecting line 16:
on the actuator side with respect to the diaphragm 17, the volumetric flow control valve 18 and the pressure control valve 19; and
on the pump side with respect to the injection valve 14.

The control unit 7 is shown schematically. It is in signal connection with the various controllable elements of the hydraulic system, namely, for example, the pump motor 11, the pump 10 (if it is an adjustable pump), the injection valve 14, the brake valve 15, the blocking slide 13, the position sensor 22, the volumetric flow control valve 18, the pressure control valve 19 and all other controllable valves which are shown in FIG. 2 and the protective door 26 shown in FIG. 4. For reasons of clarity, these signal connections are not shown.

When the control unit 7 changes into the at least one safety mode, it first triggers the following:
limiting a rotational speed of the at least one pump motor 11 to a maximum rotational speed,
controlling the at least one blocking slide 13 for decoupling the at least one pressure accumulator 12 from the rest of the hydraulic system 5 (position shown),
controlling the injection valve 14 (for example by energizing it) so that the hydraulic connection between the injection actuator 4 and the low-pressure volume is present (position shown), wherein a fluid connection exists between the injection actuator 4 and the low-pressure volume via the connecting line 16 and the dynamic-pressure line 20 when the further valve 21 is switched, and controlling the brake valve 15 so that there is a fluid connection between the piston-cylinder unit and the low-pressure volume (position shown).

As mentioned, the control unit 7 is signal-connected to the position sensor 22 and can thus detect when an undesired retraction movement of the piston 8 and thus of the injection actuator 4 takes place.

In the switching position shown in FIG. 2, the control unit 7 can control the pump motor 11, the pump 10, the pressure control valve 19, the volumetric flow control valve 18 and the injection valve 14 in such a way that this retraction movement is at least partially, preferably completely counteracted.

In other words, the control unit in this exemplary embodiment is designed to control the hydraulic system 5, preferably the at least one pump 10, on the basis of the measurement signals of the position sensor 22, in order to increase or reduce the pressure at the injection actuator 4 (here in particular the pressure in the chamber acting to the right in the cylinder 9), in order to at least partially counteract a change in position of the injection actuator 4 caused by the action of the plasticized molding compound 31 present in the barrel 3.

At the same time, all safety requirements are met in this example because the following measures are taken:
- the volumetric flow directed towards the cylinder 9 cannot increase excessively because of the diaphragm 17.
- The pressure in the chamber of the cylinder 9 acting to the right can be relieved by opening the further valve 21 if a pressure threshold value or the like is exceeded.

An undesired injection movement of the piston 8 or of the injection actuator 4 can thereby be reliably prevented.

Figure 3:
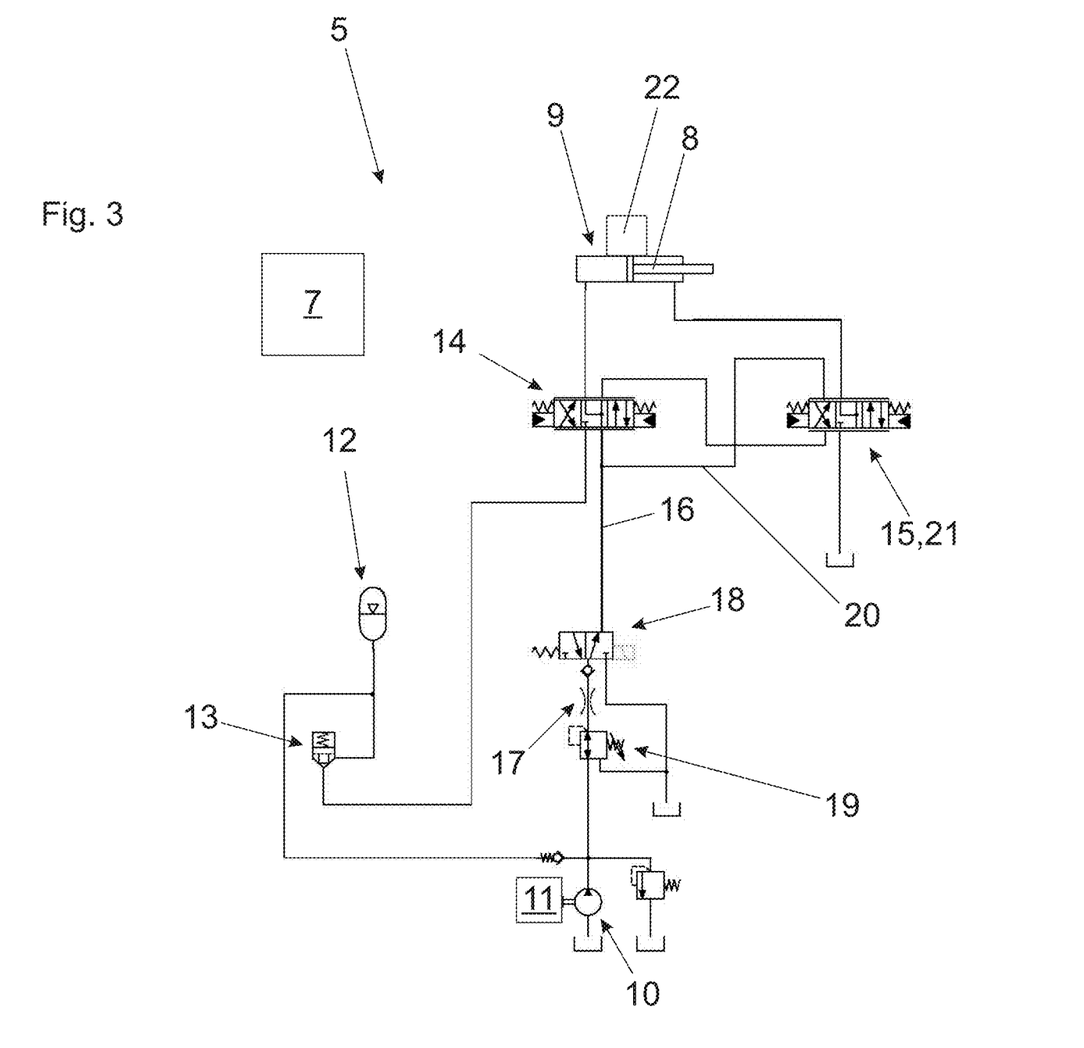
FIG. 3 schematically shows a further exemplary embodiment of a hydraulic system and FIG. 4 schematically shows an exemplary embodiment according to the invention of a production plant.

FIG. 3 schematically shows a further exemplary embodiment of a hydraulic system 5.

In contrast to FIG. 2, the brake valve 15, which is spring-loaded in any case, takes over the function of the further valve 21, as a result of which the connection of the injection valve 14 and the brake valve 15 requires fewer connections and the hydraulic block containing the injection valve 14 and the brake valve 15 can be designed more simply.

The other components, elements and functions described in connection with FIG. 2 are also present in the exemplary embodiment according to FIG. 3.

FIG. 4 schematically shows an exemplary embodiment according to the invention of a production plant 1 according to the invention.

The injection unit 2 is similar to that of FIG. 1, with the shut-off nozzle position sensor 24 and some reference numerals no longer being shown for reasons of clarity, the corresponding elements including the shut-off nozzle position sensor 24 still being present.

In addition, a closing unit 28, for example with mold clamping plates movable relative to one another, is provided in the production plant 1 according to FIG. 4. A mold to be mounted on it is indicated by broken lines.

In order to carry out the production process in at least one production mode, the mold can be closed by means of the mold clamping plates, and the molding compound 31 plasticized in the metering process can be injected by the injection movement into at least one mold cavity in the mold, as a result of which the plasticized molding compound 31 is preformed and a molded part is produced after cooling thereof.

In the configuration shown schematically in FIG. 4, the injection unit 2 together with the closing unit 28 forms a forming machine 27, here specifically an injection molding machine.

An access safety device 6, known per se, is provided around the production plant 1 and, in this exemplary embodiment, has a protective wall 25 and a protective door 26, the latter being, as mentioned, signal-connected to the control unit.

If the protective door 26 is opened, for example because a person wants to remove a jammed molded part in the safety area, the control unit 7 automatically switches into at least one safety mode and carries out the functions explained in connection with FIG. 2, in order firstly to prevent the injection actuator 4 from carrying out an injection movement and secondly to prevent the injection actuator 4 from carrying out an undesired retraction movement The hydraulic system 5 in FIG. 4 can be designed for this purpose, for example, as in FIG. 2 or FIG. 3.

Further exemplary embodiments are conceivable. For example, the pressure source which is used for preventing the screw retraction movement could also be a pressure accumulator 12. For example, the connecting line 16 could also be connected hydraulically to the cylinder 9 via a valve separate from the injection valve 14. In addition, for example, the function of the diaphragm could be fulfilled by a passive spring-loaded valve.

LIST OF REFERENCE NUMERALS 1 production plant
2 injection unit
3 barrel
4 injection actuator
5 hydraulic system
6 access safety device
7 control unit
8 piston
9 cylinder
10 pump
11 pump motor
12 pressure accumulator
13 blocking slide
14 injection valve
15 brake valve
16 connecting line
17 diaphragm
18 volumetric flow control valve
19 pressure control valve
20 dynamic pressure line
21 additional valve
22 position sensor
23 shut-off nozzle
24 shut-off nozzle position sensor
25 protective grid
26 protective door
27 forming machine
28 closing unit
29 metering motor
30 funnel
31 plasticized molding compound

The invention claimed is:

1. A production plant comprising:
an injection unit configured to perform forming processes, the injection unit including a barrel and an injection actuator;
a hydraulic system for moving the injection actuator;

an access safety device configured to output an access signal when an access of a person to the production plant or an access possibility for a person to the production plant is detected; and
an electronic control unit configured to operate the hydraulic system in at least one production mode and in at least one safety mode,
wherein the electronic control unit is configured to switch from the at least one production mode to the at least one safety mode when the access safety device outputs the access signal, and is configured to operate the hydraulic system in the at least one safety mode such that the hydraulic system at least partially counteracts an axial movement of the injection actuator caused directly or indirectly by an action of a molding compound present in the barrel on the injection actuator.

2. The production plant according to claim 1, further comprising a hydraulic piston-cylinder unit for moving the injection actuator.

3. The production plant according to claim 1, wherein the injection actuator contains a plasticizing screw or an injection piston.

4. The production plant according to claim 1, wherein the hydraulic system comprises at least one of:
at least one pump including a pump motor for driving the at least one pump;
at least one pressure accumulator;
an injection valve configured to release, shut off or meter a first hydraulic fluid stream provided for the injection actuator in order to carry out an injection movement;
a brake valve which is configured to release, shut off or meter a second hydraulic fluid stream pushed out of a piston-cylinder unit during an injection movement, the piston-cylinder unit being configured to move the injection actuator; or
a low-pressure volume.

5. The production plant according to claim 4, wherein;
the hydraulic system comprises the at least one pump, and the electronic control unit is configured to, when in the at least one safety mode, limit a speed of the pump motor to a maximum speed;
the hydraulic system comprises the at least one pressure accumulator and a blocking slide by means of which the at least one pressure accumulator can be decoupled from the rest of the hydraulic system, and the electronic control unit is configured to, when in the at least one safety mode, control the blocking slide for decoupling the at least one pressure accumulator from the rest of the hydraulic system;
the hydraulic system comprises the injection valve and the low-pressure volume, and the electronic control unit is configured to, when in the at least one safety mode, control the injection valve such that there is a hydraulic connection between the injection actuator and the low-pressure volume; or
the hydraulic system comprises the brake valve and the low-pressure volume, and the electronic control unit is configured to, when in the at least one safety mode, control the brake valve such that there is a fluid connection between the piston-cylinder unit and the low-pressure volume.

6. The production plant according to claim 1, wherein the hydraulic system contains a connecting line which is set up such that, in the at least one safety mode, there is a fluid connection between a pressure side of a pressure source and the injection actuator.

7. The production plant according to claim 6, wherein at least one of the following is provided in the connecting line:
a diaphragm for setting a maximum hydraulic fluid volumetric flow;
a volumetric flow switching valve; or
a pressure control valve.

8. The production plant according to claim 6, wherein a dynamic pressure line branches off from the connecting line, wherein the dynamic pressure line opens into a low pressure volume, and a switchable valve is arranged in the dynamic pressure line.

9. The production plant according to claim 4, wherein the hydraulic system comprises the injection valve, the brake valve and the low-pressure volume,
wherein the electronic control unit is configured to, when in the at least one safety mode, control the injection valve such that there is a hydraulic connection between the injection actuator and the low-pressure volume, and
wherein a fluid connection is present between the injection actuator and the low-pressure volume when the brake valve is switched.

10. The production plant according to claim 1, further comprising a position sensor provided for detecting a position of the injection actuator or a position of a piston of a piston-cylinder unit, the piston-cylinder unit being configured to move the injection actuator, wherein the electronic control unit is configured to receive measurement signals of the position sensor.

11. The production plant according to claim 10, wherein the electronic control unit is configured to control the hydraulic system based on the measurement signals of the position sensor in order to increase or reduce a pressure at the injection actuator, in order to at least partially counteract a change in position of the injection actuator caused by the action of the molding compound present in the barrel.

12. The production plant according to claim 1, wherein the injection unit has a shut-off nozzle configured to prevent plasticized molding compound from escaping from the barrel.

13. The production plant according to claim 1, wherein the access safety device has at least one of the following:
a protective grid; or
a protective wall; or
a protective door; or
a light barrier; or
a light curtain; or
a nozzle protection.

14. The production plant according to claim 1, wherein the production plant has a forming machine and the injection unit is part of the forming machine.

15. A method for operating a production plant having an injection unit including a barrel and an injection actuator, and having a hydraulic system for moving the injection actuator, the method comprising:
operating the hydraulic system in a safety mode when access to the production plant or an access possibility to the production plant is detected; and
operating the hydraulic system in the safety mode such that the hydraulic system at least partially counteracts an axial movement of the injection actuator caused directly or indirectly by an action of a molding compound present in the barrel on the injection actuator.

16. A use of method for operating the production plant according to claim 1, the method comprising:
operating the hydraulic system in the at least one safety mode when access to the production plant or an access possibility to the production plant is detected; and operating the hydraulic system in the at least one safety mode such that the hydraulic system completely counteracts an axial movement of the injection actuator caused directly or indirectly by an action of the molding compound present in the barrel on the injection actuator.

17. The production plant according to claim 1, wherein the injection unit is configured to perform injection molding processes, and wherein the electronic control unit is configured to operate the hydraulic system in the at least one safety mode such that the hydraulic system completely counteracts the axial movement of the injection actuator caused directly or indirectly by the action of the molding compound present in the barrel on the injection actuator.

18. The production plant according to claim 2, wherein the piston of the piston-cylinder unit is rotatable relative to the cylinder.

19. The production plant according to claim 4, wherein:

the hydraulic system comprises the at least one pressure accumulator and a blocking slide by means of which the at least one pressure accumulator can be decoupled from the rest of the hydraulic system; or the hydraulic system comprises the low-pressure volume, and the low-pressure volume is a tank.

20. The production plant according to claim 5, wherein the hydraulic system comprises the injection valve and the low-pressure volume, and the electronic control unit is configured to, when in the at least one safety mode, control the injection valve such that there is the hydraulic connection between the injection actuator and the low-pressure volume, and wherein a fluid connection is present between the injection actuator and the low-pressure volume when a further valve is switched.

21. The production plant according to claim 6, wherein the pressure source comprises at least one pump, and the fluid connection is provided via an injection valve.

22. The production plant according to claim 7, wherein the volumetric flow switching valve is provided in the connecting line, and the volumetric flow switching valve is a volumetric flow control valve.

23. The production plant according to claim 11, wherein the hydraulic system comprises at least one pump including a pump motor for driving the at least one pump, and wherein the electronic control unit is configured to control the pump motor of the hydraulic system based on the measurement signals of the position sensor.

24. The production plant according to claim 12, further comprising a shut-off nozzle position sensor, wherein the electronic control unit is configured to receive measurement signals of the shut-off nozzle position sensor.

* * * * *